United States Patent
Witte et al.

(10) Patent No.: US 10,737,675 B2
(45) Date of Patent: Aug. 11, 2020

(54) METHOD FOR CONTROLLING A BRAKING SYSTEM CAPABLE OF CARRYING OUT THE PARKING BRAKE FUNCTION

(71) Applicant: FOUNDATION BRAKES FRANCE, Drancy (FR)

(72) Inventors: Lennart Witte, Eaubonne (FR); Benoit Ghesquiere, Nanteuil le Haudouin (FR); Aleksander Hurwic, Paris (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 0 days.

(21) Appl. No.: 16/062,481

(22) PCT Filed: Dec. 14, 2016

(86) PCT No.: PCT/EP2016/081048
§ 371 (c)(1),
(2) Date: Jun. 14, 2018

(87) PCT Pub. No.: WO2017/102869
PCT Pub. Date: Jun. 22, 2017

(65) Prior Publication Data
US 2018/0370512 A1  Dec. 27, 2018

(30) Foreign Application Priority Data
Dec. 15, 2015  (FR) ...................... 15 62385

(51) Int. Cl.
*B60T 13/66* (2006.01)
*B60T 7/04* (2006.01)
*B60T 13/74* (2006.01)

(52) U.S. Cl.
CPC ............ *B60T 13/662* (2013.01); *B60T 7/045* (2013.01); *B60T 13/745* (2013.01)

(58) Field of Classification Search
CPC ....... B60T 13/662; B60T 13/745; B60T 7/045
See application file for complete search history.

(56) References Cited

U.S. PATENT DOCUMENTS

| 7,744,166 B2 | 6/2010 | Leiter et al. | |
| 8,448,756 B2 * | 5/2013 | Knechtges | B60T 8/32 188/72.2 |

(Continued)

OTHER PUBLICATIONS

International Search Report, dated Mar. 20, 2017, from corresponding PCT application No. PCT/EP2016/081048.

(Continued)

*Primary Examiner* — Frederick M Brushaber
(74) *Attorney, Agent, or Firm* — Young & Thompson

(57) ABSTRACT

Disclosed is a method for controlling a braking system for a motor vehicle, capable of implementing a parking brake function. The system includes a disk, a brake caliper and at least one piston to exert a disk clamping force on the disk, the braking system further including an electric drive unit moving the piston relative to the caliper and a hydraulic drive unit moving the piston relative to the caliper. The method includes at least one step of exerting a disk clamping force by moving the piston, by the electric drive unit and/or the hydraulic drive unit. The method includes a step of actuating the hydraulic unit by exerting a first clamping power on the piston, followed by a step of actuating the electric unit by exerting an additional clamping power, until a total power is obtained that is high enough to lock the disk.

11 Claims, 2 Drawing Sheets

10: method
12: initialising phase
14: control step
16: determining step
18: link n° 1
20: step of actuating the electric means
22: end step
24: link n° 2
26: step of actuating the hydraulic means
28: link n° 3
30: step of actuating the electric means

(56) References Cited

U.S. PATENT DOCUMENTS

| | | | | |
|---|---|---|---|---|
| 8,764,127 | B2* | 7/2014 | Leibfried | B60T 8/1755 |
| | | | | 180/65.27 |
| 9,469,283 | B2* | 10/2016 | Nakaso | B60L 58/12 |
| 9,758,143 | B2* | 9/2017 | Ohnishi | B60T 8/3685 |
| 10,137,784 | B2* | 11/2018 | Suzuki | B60T 8/175 |
| 10,166,960 | B2* | 1/2019 | Poertzgen | B60T 7/042 |
| 10,328,920 | B2* | 6/2019 | Kistner | B60T 7/042 |
| 2008/0116740 | A1* | 5/2008 | Yokoyama | B60T 7/042 |
| | | | | 303/20 |
| 2010/0126167 | A1* | 5/2010 | Nagel | B60T 7/042 |
| | | | | 60/545 |
| 2011/0224880 | A1* | 9/2011 | Baehrle-Miller | B60T 7/042 |
| | | | | 701/70 |
| 2011/0248558 | A1* | 10/2011 | Vollert | B60T 1/10 |
| | | | | 303/3 |
| 2013/0333988 | A1* | 12/2013 | Bieltz | B60T 7/042 |
| | | | | 188/152 |
| 2014/0095042 | A1* | 4/2014 | Sakashita | B60T 13/588 |
| | | | | 701/70 |
| 2015/0008726 | A1* | 1/2015 | Minami | B60T 8/885 |
| | | | | 303/14 |
| 2015/0217738 | A1* | 8/2015 | Blattert | B60T 13/662 |
| | | | | 701/70 |
| 2016/0290425 | A1* | 10/2016 | Baehrle-Miller | B60T 13/588 |

OTHER PUBLICATIONS

FR Search Report, dated Aug. 31, 2016, from corresponding FR application No. 1562385.

* cited by examiner

10: method
12: initialising phase
14: control step
16: determining step
18: link n° 1
20: step of actuating the electric means
22: end step
24: link n° 2
26: step of actuating the hydraulic means
28: link n° 3
30: step of actuating the electric means 10: method
12: initialising phase
14: control step
16: determining step
18: link n° 1
20: step of actuating the electric means
22: end step
24: link n° 2
26: step of actuating the hydraulic means
28: link n° 3
30: step of actuating the electric means

METHOD FOR CONTROLLING A BRAKING SYSTEM CAPABLE OF CARRYING OUT THE PARKING BRAKE FUNCTION

TECHNICAL FIELD

The invention relates to a method for controlling a braking system able to perform parking brake function for an automobile vehicle, in particular for controlling a parking brake including driving electric means The invention more particularly relates to a method for controlling a braking system enabling possible failures of the electric part of the brake to be compensated for.

STATE OF PRIOR ART

A modern automobile vehicle is today equipped with a braking electric control system the purpose of which is to activate braking functions which are independent of the actuation by the vehicle's driver. Such functions are automatic brake functions, such as slip driving control (anti-slip regulation (ASR)) or control drive dynamic (Electronic Stability Program (ESP)) to be performed in addition to the anti-lock control function (anti-lock braking system (ABS)), or the parking brake function which also enables the vehicle to be held stationary when the driver is absent and also on a sloped road.

These mechanical means specially include electric means which act on the piston driving hydraulic circuit of the brake system which complete the action of the mechanical means on the hydraulic circuit, in case of failure of the latter.

Document U.S. Pat. No. 7,744,166 describes a method for controlling such a parking brake, which consists in exerting the braking action by the mechanical means and then completing this action by the hydraulic means, when the action of the mechanical means is insufficient.

Such a method is particularly complex because it requires to determine the amplitude of each of the braking actions exerted by the hydraulic and mechanical means, and then to modulate the same.

DISCLOSURE OF THE INVENTION

The invention has mainly the object to provide a method for controlling a braking system for an automobile vehicle which is able to implement a parking brake function, the braking system including in particular a disk, a brake calliper and at least one movable piston and which cooperates with the calliper to exert on the disk a disk clamping force, the braking system further including electric means and hydraulic means for driving the piston in order to produce a disk clamping force, the method including a step of actuating the electric means to exert a disk clamping force characterised in that, the method includes a step of actuating the hydraulic means which consists in exerting on the piston a clamping force, which is followed by the step of actuating the electric means, said step of actuating the hydraulic means being implemented at least when the disk clamping force able to be produced by the electric means is insufficient to perform disk locking.

The actuation of the hydraulic means prior to the actuation of the mechanical means enables the entire braking action they can exert to be exerted. Therefore, they do not have to be necessarily regulated. As a result, the control method is simple to implement and thus it is more efficient.

Preferably, the method includes a step of determining whether the power which the electric means are able to produce is high enough to perform a disk locking which is prior to the step of actuating the hydraulic means and prior to the step of actuating the electric means, and in that the step of actuating the hydraulic means is implemented before the step of actuating the electric means when at the end of the determining step, it has been determined that the electric means are not able to exert a high enough force.

Preferably, when at the end of the determining step, it has been determined that the electric means are able to exert a high enough force, the step of actuating the hydraulic means is not implemented.

Preferably, the determining step includes a phase of measuring the braking force able to be exerted by the driving electric means.

Preferably, the determining step includes a phase of measuring a characteristic value of a circuit for electrically supplying the vehicle, which circuit includes the battery.

Preferably, the electric value measured is a voltage.

Preferably, the electric value measured is an energy likely to be delivered to the electric actuating means.

Preferably, the electric value measured is an available power.

Preferably, the method includes a prior step of actuating the electric means which is implemented before the steps of actuating the electric means and hydraulic means.

The invention has also the object to provide a braking system for an automobile vehicle including a brake comprising a piston for applying a brake pad to a disk, hydraulic means for driving the piston for service brakings, electric means for driving the piston for parking braking, a source delivering, to order, pressurised brake fluid to said piston, a control calculator and a battery, ensuring, to order, the electric supply of the electric means for driving the piston, characterised in that it includes battery failure detecting means, and control means for activating the hydraulic means followed by activating the electric means for driving the piston upon activating the parking brake.

BRIEF DESCRIPTION OF THE DRAWINGS

Further characteristics and advantages of the invention will appear upon reading the detailed description that follows for the understanding of which the appended figures will be referred to in which.

DETAILED DISCLOSURE OF PARTICULAR EMBODIMENTS

Figure 1:
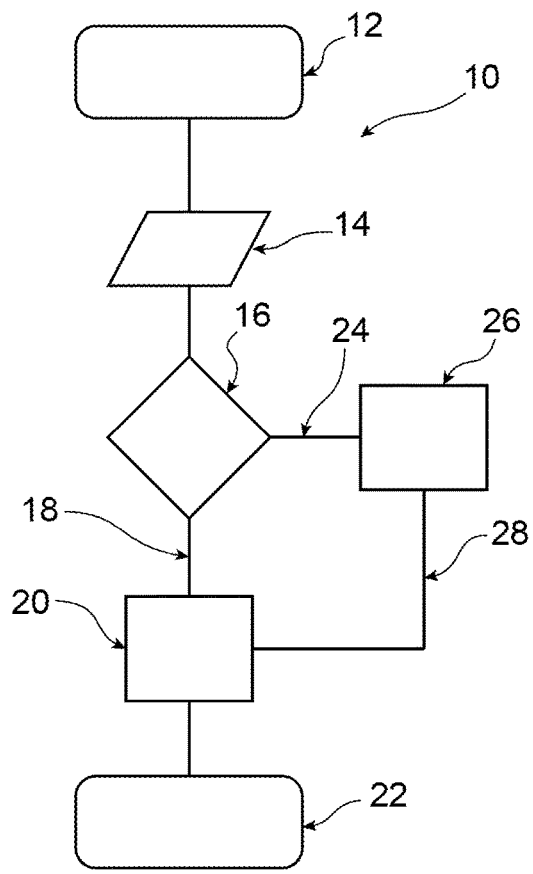
FIG. 1 is a diagram representing the successive steps of the method according to the invention.

In FIG. 1, a method 10 for controlling a braking system enabling to ensure the parking brake function of an automobile vehicle has been represented.

The braking system is a disk brake system including in particular a brake disk integral with a vehicle wheel, a calliper movable with respect to the brake disk and at least one piston movable with respect to the calliper, which are connected to the vehicle structure and which are able to clamp the disk to limit or prevent the disk rotation with respect to the vehicle structure.

The piston is movably driven with respect to the calliper by driving hydraulic means, by which a fluid exerts a pressure on the piston, and driving electric means, which use an electric energy source, such as the vehicle battery, for driving the piston.

The driving electric means include in particular an electric actuator such as a motor which is connected to the vehicle electric source, that is the vehicle battery, and a transmission mechanical device which connects the actuator to the piston, for driving the piston by the actuator to the disk to exert the clamping force required.

Once this force is reached, the motor is no longer supplied and the transmission mechanical device maintains the piston in the position for which the clamping force required is exerted and maintained as such. This makes it possible to have a braking system using no energy to be maintained as such.

The braking system is able to implement the parking brake function, which consists in clamping the brake disk by the calliper and the piston with a high enough clamping force for the vehicle to remain stationary, regardless of the environment conditions of the vehicle.

This parking brake function is preferably implemented by the driving electric means since they consume no energy once the brake disk is clamped with the clamping force required.

However, in case of failure, in particular a failure of the electric motor or a decrease in the available electric energy from the battery, the driving electric means are not able to produce by themselves own a high enough brake disk clamping force to maintain the vehicle stationary.

In this case, it is known to use the driving hydraulic means and the driving electric means to exert the brake disk clamping force together.

The braking system is controlled by a central processing unit, for example the calculator of the ESP unit which implements a method 10 which will be described thereafter, and which is implemented as soon as an order for operating the parking brake is emitted. Such a method 10 is schematically represented in FIG. 1.

The method includes an initializing phase 12 followed by a control step 14 for implementing the parking brake function.

This control step 14 is followed by a step 16 of determining whether an electric value which the electric means are able to deliver on the piston is high enough to perform a disk rotatable lock. This electric value is for example the power or voltage able to be delivered by the electric means.

This determining step 16 includes for example a phase of measuring the braking power or force able to be produced by the driving electric means or a step of measuring the electric power, or the voltage, which is able to be provided to the driving electric means, from the vehicle battery.

At the end of this determining step 16, and as can be seen with the link 18, if it has been determined that the braking force which the electric means are able to produce, is the one desired, then, a step 20 of actuating the electric means is implemented. Indeed, the driving electric means are thereby sufficient by themselves to produce the clamping force of the brake disk, the use of the driving hydraulic means is thereby no longer necessary. This course of the method 10 corresponds to a normal operation of the braking system.

This actuating step 20 is then followed by a step 22 of the end of the method 10, which is implemented when the braking force has been exerted.

At the end of the determining step 16, and as can be seen with the link 24, in the case of degraded operation of the braking system, it has been determined that the braking force which the electric means are able to produce, or the power or voltage able to be provided to the electric means, is not enough, the determining step 16 is then followed by a step 26 of actuating the driving hydraulic means.

During this actuating step 26, the driving hydraulic means exert on the piston a force which is generally lower than the force required for the parking brake function.

Thus, as can be seen with the link 28, the step 26 of actuating the driving hydraulic means is followed by the step 20 of actuating the electric means to exert a further clamping force which completes the force exerted by the driving hydraulic means.

This step 20 of actuating the electric means is here again followed by the step 22 of the end of the method.

Figure 2:
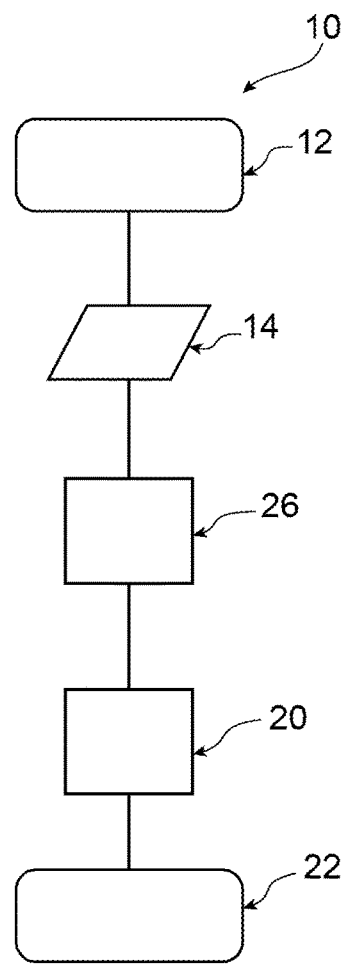
FIG. 2 is a diagram representing an alternative of the method according to the invention.

In FIG. 2, a diagram representative of an alternative embodiment of the method according to which the step 26 of actuating the hydraulic means is systematically implemented before step 20 of actuating the electric means is represented.

A method according to such an alternative embodiment is simpler to implement because it includes no step 16 of determining the power which the electric means are able to exert.

According to an alternative embodiment, the method includes a first step 30 of actuating the electric means, which is implemented immediately after the control step 14.

This first actuation of the electric means enables an initial braking force to be produced on the disk, in some cases of operation of the braking system, which is lower than the braking force required to perform parking brake.

The step of the first actuation is then followed by the determining step 16, to determine which amplitude of the braking force has been obtained by the first actuation of the electric means and which amplitude of the braking force they can still exert possibly. This determining step is similar to that described in reference to the embodiments represented in FIGS. 1 and 2 and includes a phase of measuring the power or braking force able to be produced by the driving electric means or a step of measuring the electric power, or voltage, which is able to be provided to the driving electric means, from the vehicle battery.

The continuation of the course of the method according to this alternative embodiment is similar to the embodiments described previously.

Figure 3:
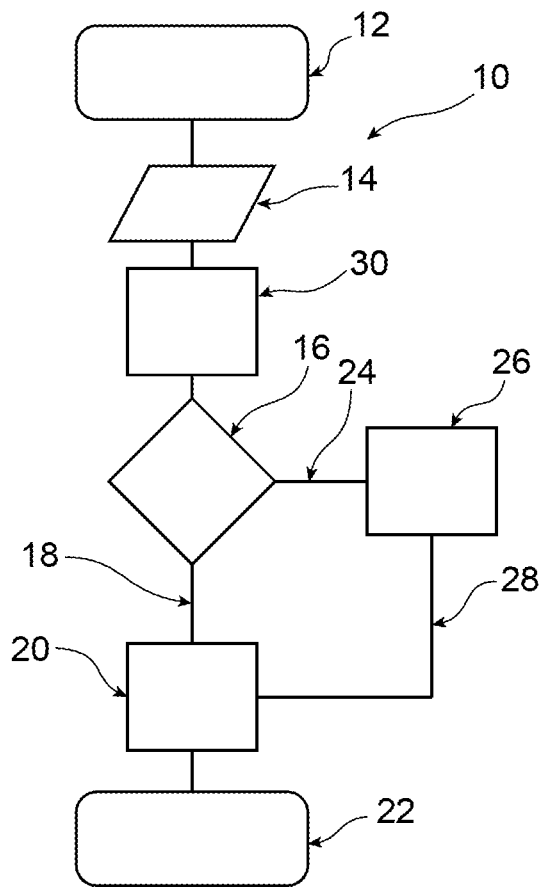
FIGS. 3 and 4 are diagrams representing another embodiment of two alternatives represented in FIGS. 1 and 2.

Thus, according to the embodiment represented in FIG. 3, in the case of a normal operation of the braking system, it has been determined that the braking force which the electric means are able to produce, is the one desired, the determining step 16 is then followed by the step 20 of further actuating the electric means.

On the other hand, in the case of a degraded operation of the braking system, it has been determined that the braking force which the electric means are able to produce, or the power or the voltage able to be provided to the electric means, is not enough, the determining step 16 is then followed by a step 26 of actuating the driving hydraulic means and then the step 20 of actuating the electric means to exert a further clamping force which completes the force exerted by the driving hydraulic means.

Figure 4:
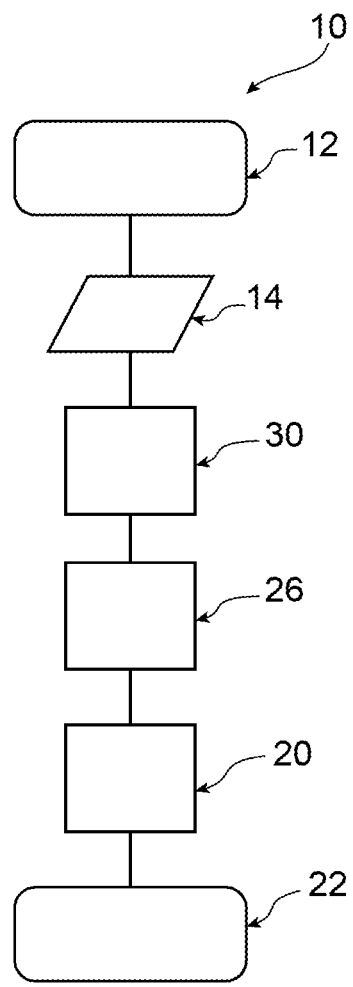

Thus, according to the embodiment represented in FIG. 4, the step 26 of actuating the hydraulic means is systematically implemented after the first step 30 of actuating the electric means and is followed by a second step 20 of actuating the electric means.

It will be understood that some time can elapse between the implementation of the first step 30 of actuating the electric means and the implementation of steps 20, 26 of actuating the electric means or hydraulic means without departing from the scope of the invention.

Thus, regardless of the operating conditions of the braking system, and in particular the driving electric means, at the end of the step of actuating the electric means, the clamping force of the brake disk is at least equal to the clamping force necessary to ensure parking brake function.

The vehicle can thus be made stationary at any time.

The method 10 according to the invention is advantageously implemented on a vehicle the wheels of which are provided, at least on one axis, with a floating calliper electric parking brake as described in document FR-1.261.935 which is incorporated in reference.

The method according to the invention is advantageously implemented on a vehicle provided with a hydraulic unit of an ESP system including an electrically driven pump and solenoid valves preferably pulse width modulated (PWM) controlled.

NOMENCLATURE

10: method
12: initialising phase
14: control step
16: determining step
18: link n° 1
20: step of actuating the electric means
22: end step
24: link n° 2
26: step of actuating the hydraulic means
28: link n° 3
30: step of actuating the electric means

The invention claimed is:

1. A method (10) for controlling a braking system for an automobile vehicle which is able to implement a parking brake function, the braking system including a disk, a brake calliper, at least one movable piston, the at least one movable piston cooperating with the brake calliper to exert a disk clamping force on the disk to implement the parking brake function, an electric actuator able to exert a clamping force on the at least one movable piston in order to cooperate with the brake calliper to produce the disk clamping force to implement the parking brake function, and a hydraulic circuit connected to drive the at least one movable piston with respect to the brake calliper with a fluid that exerts a pressure on the at least one movable piston, the hydraulic circuit driving the at least one movable piston in order to produce a clamping force on the at least one movable piston in order to cooperate with the brake calliper to produce the disk clamping force to implement the parking brake function, the hydraulic circuit including an electrically driven pump, the method (10) comprising:

a determining step of determining whether the clamping force which the electric actuator is able to produce is high enough when exerted on the at least one movable piston in order to cooperate with the brake calliper to be sufficient to produce the disk clamping force to perform a disk locking;

when the determining step determines that the clamping force which the electric actuator is able to produce is sufficient, when exerted on the at least one movable piston in order to cooperate with the brake calliper, to produce the disk clamping force to perform the disk locking, a step of actuating the electric actuator to exert the clamping force on the at least one movable piston, wherein the clamping force being exerted on the at least one movable piston being sufficient to produce the disk clamping force to perform the disk locking without use of the hydraulic circuit; and when the determining step determines that the clamping force which the electric actuator is able to produce is insufficient when exerted on the at least one movable piston in order to cooperate with the brake calliper to produce the disk clamping force to perform the disk locking, a step of actuating the hydraulic circuit to exert the clamping force on the at least one movable piston, and then subsequent to the step of actuating the hydraulic circuit to exert the clamping force on the at least one movable piston, performing said step of actuating the electric actuator to exert a further clamping force on the at least one movable piston.

2. The method (10) according to claim 1, wherein when the determining step (16) determines that the electric actuator is able to exert a high enough force, the step of actuating the hydraulic circuit is not implemented.

3. The method (10) according to claim 1, wherein the determining step (16) includes a phase of measuring a braking force able to be exerted by the electric actuator.

4. The method (10) according to claim 1, wherein the determining step (16) includes a phase of measuring a characteristic electric value of a circuit for electrically supplying the automobile vehicle, which circuit includes a battery.

5. The method according to claim 4, wherein the characteristic electric value measured is an energy likely to be delivered to the electric actuator.

6. The method according to claim 5, wherein the characteristic electric value measured is an available power.

7. The method according to claim 4, wherein the characteristic electric value measured is a voltage able to be provided to the electric actuator.

8. The method according to claim 1, further comprising a prior step (30) of actuating the electric actuator which is implemented before the determining step.

9. A method (10) for controlling a braking system for an automobile vehicle which is able to implement a parking brake function, the braking system including a disk, a brake calliper, at least one movable piston, the at least one movable piston cooperating with the brake calliper to exert a disk clamping force on the disk to implement the parking brake function, an electric actuator able to exert a clamping force on the at least one movable piston in order to cooperate with the brake calliper to produce the disk clamping force to implement the parking brake function, and a hydraulic circuit connected to drive the at least one movable piston with respect to the brake calliper with a fluid that exerts a pressure on the at least one movable piston, the hydraulic circuit driving the at least one movable piston in order to produce a clamping force on the at least one movable piston in order to cooperate with the brake calliper to produce the disk clamping force to implement the parking brake function, the hydraulic circuit including an electrically driven pump, the method (10) comprising:

measuring braking force able to be exerted by the electric actuator as part of a determining step of determining whether the clamping force which the electric actuator is able to produce is high enough when exerted on the at least one movable piston in order to cooperate with the brake calliper to be sufficient to produce the disk clamping force to perform a disk locking;

when the determining step determines that the clamping force which the electric actuator is able to produce is sufficient when exerted on the at least one movable piston in order to cooperate with the brake calliper to produce the disk clamping force to perform the disk locking, a step of actuating the electric actuator to exert the clamping force on the at least one movable piston, wherein the clamping force being exerted on the at least one movable piston being sufficient to produce the disk clamping force to perform the disk locking without use of the hydraulic circuit; and when the determining step determines that the clamping force which the electric actuator is able to produce is insufficient when exerted on the at least one movable piston in order to cooperate with the brake calliper to produce the disk clamping force to perform the disk locking, a step of actuating the hydraulic circuit to exert the clamping force on the at least one movable piston, and then subsequent to the step of actuating the hydraulic circuit to exert the clamping force on the at least one movable piston, performing said step of actuating the electric actuator to exert a further clamping force on the at least one movable piston.

10. A method (10) for controlling a braking system for an automobile vehicle which is able to implement a parking brake function, the braking system including a disk, a brake calliper, at least one movable piston, the at least one movable piston cooperating with the brake calliper to exert a disk clamping force on the disk to implement the parking brake function, an electric actuator able to exert a clamping force on the at least one movable piston in order to cooperate with the brake calliper to produce the disk clamping force to implement the parking brake function, a hydraulic circuit connected to drive the at least one movable piston with respect to the brake calliper with a fluid that exerts a pressure on the at least one movable piston, the hydraulic circuit driving the at least one movable piston in order to produce a clamping force on the at least one movable piston in order to cooperate with the brake calliper to produce the disk clamping force to implement the parking brake function, the hydraulic circuit including an electrically driven pump, and a circuit for electrically supplying the automobile vehicle, the circuit for electrically supplying the automobile vehicle including a battery arranged as an energy source for the electric actuator, the method (10) comprising:

measuring a characteristic value of the circuit for electrically supplying the automobile vehicle as part of a determining step of determining whether the clamping force which the electric actuator is able to produce is high enough when exerted on the at least one movable piston in order to cooperate with the brake calliper to be sufficient to produce the disk clamping force to perform a disk locking;

when the determining step determines that the clamping force which the electric actuator is able to produce is sufficient when exerted on the at least one movable piston in order to cooperate with the brake calliper to produce the disk clamping force to perform the disk locking, a step of actuating the electric actuator to exert the clamping force on the at least one movable piston, wherein the clamping force being exerted on the at least one movable piston being sufficient to produce the disk clamping force to perform the disk locking without use of the hydraulic circuit; and when the determining step determines that the clamping force which the electric actuator is able to produce is insufficient when exerted on the at least one movable piston in order to cooperate with the brake calliper to produce the disk clamping force to perform the disk locking, a step of actuating the hydraulic circuit to exert the clamping force on the at least one movable piston, and then subsequent to the step of actuating the hydraulic circuit to exert the clamping force on the at least one movable piston, performing said step of actuating the electric actuator to exert a further clamping force on the at least one movable piston.

11. A braking system for an automobile vehicle, the braking system comprising:

a brake that includes a brake pad, a disk, a brake calliper, and a piston, the piston being movable for applying the brake pad to the disk by the piston cooperating with the brake calliper to exert a disk clamping force on the disk to implement a parking brake function;

an electric actuator able to exert a clamping force on the piston in order to cooperate with the brake calliper to produce the disk clamping force to implement the parking brake function;

a circuit for electrically supplying the automobile vehicle, the circuit for electrically supplying the automobile vehicle including a battery arranged as an energy source for the electric actuator;

a hydraulic circuit connected to drive the piston with respect to the brake calliper with a pressurised brake fluid that exerts a pressure on the piston, the hydraulic circuit driving the piston in order to produce a clamping force on the piston in order to cooperate with the brake calliper to produce the disk clamping force to implement the parking brake function, the hydraulic circuit including an electrically driven pump, the hydraulic circuit including a source delivering, to order, the pressurised brake fluid to the piston; and control means for activating the hydraulic circuit and the electric actuator, wherein, the control means is configured for measuring a characteristic electric value of the circuit for electrically supplying the automobile vehicle for determining whether the electric actuator is able to produce a clamping force that is high enough when exerted on the piston to produce the disk clamping force necessary to perform a disk locking of the parking brake function, wherein the characteristic electric value measured is a voltage able to be provided to the electric actuator, and the control means is configured such that when the clamping force which the electric actuator is able to produce is determined to be insufficient to produce the disk clamping force necessary to perform the disk locking, the control means actuates the hydraulic circuit to exert the clamping force on the piston, and subsequently to actuating the hydraulic circuit to exert the clamping force on the piston, then actuating the electric actuator to exert a further clamping force on the piston.

* * * * *